July 20, 1965 A. P. R. POCHAN 3,195,356
APPARATUS INTENDED FOR THE ACCURATE MEASUREMENT
OF THE DENSITY OF LIQUIDS
Filed Jan. 15, 1962 2 Sheets-Sheet 1
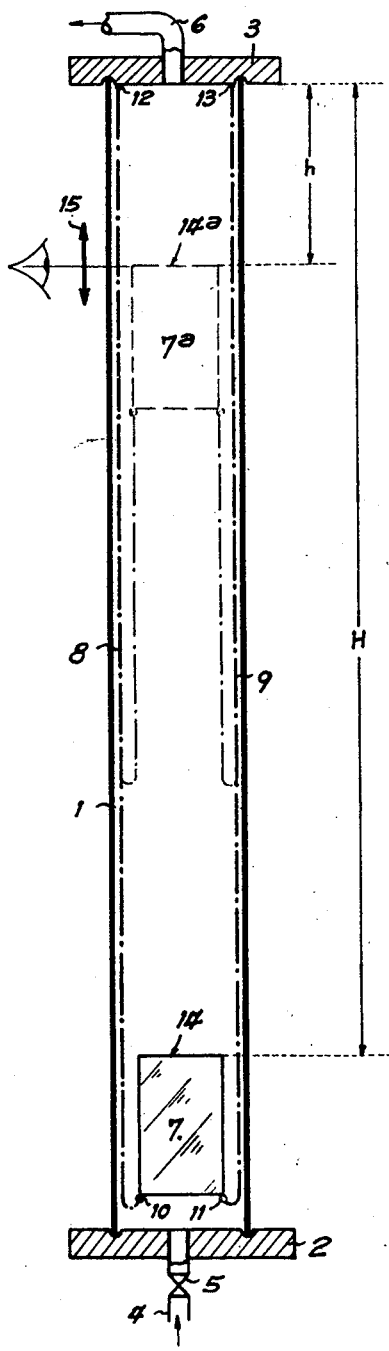
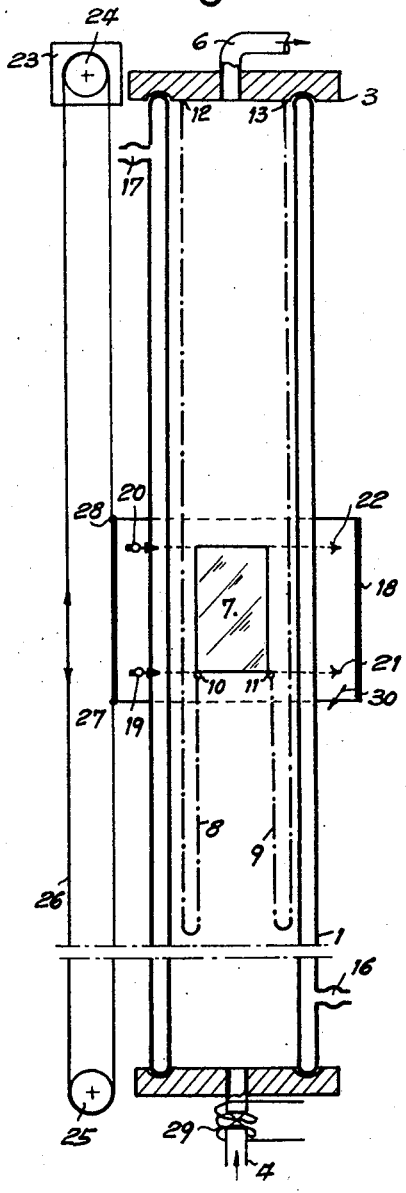
INVENTOR.
ANDRE P. R. POCHAN
BY
Woodhams Blanchard & Flynn
ATTORNEYS

United States Patent Office 3,195,356
Patented July 20, 1965

3,195,356
APPARATUS INTENDED FOR THE ACCURATE MEASUREMENT OF THE DENSITY OF LIQUIDS
André Pélissier Robert Pochan, Montesson, France, assignor of one-half to Regulateurs Francel, Paris, France, a company of France
Filed Jan. 15, 1962, Ser. No. 166,094
Claims priority, application France, Jan. 18, 1961, 850,034, Patent 1,286,014
7 Claims. (Cl. 73—437)

The present invention relates to a densitometer, that is to say an apparatus intended for the measurement of the density of liquids.

One object of the present invention is a densitometer which provides a means of measuring the density of a liquid with great accuracy, even if the surface tension of the liquid is not known under the conditions of execution of the measurement.

A further object of the invention is to construct a densitometer which additionally makes it possible to record this specific gravity, said recording operation being arranged to take place continuously if necessary.

Another object of the invention is to construct a densitometer by virtue of which the specific gravity of the liquid which is subjected to inspection can be maintained constant, this constant value being maintained automatically if necessary, by means of an appropriate control device.

For the purpose of achieving these different objects as well as other objects which will be brought out in the detailed description of the invention, the densitometer in accordance with the present invention comprises essentially: a graduated test tube containing the liquid, a mass which is immersed in said liquid and which has an apparent density which is lower than that of said liquid, two chains having a constant linear weight and the ends of which are fixed on the one hand to the bottom end of said mass and on the other hand to the top portion of the test tube, and means for indicating the position of said mass which is immersed in said liquid.

In accordance with one form of embodiment, it is the highest point of the immersed mass which constitutes the basis of reference for taking the measurement. The position of this point can be read by means of a magnifying glass or telescope without parallax.

But it is preferable that the reading should be taken automatically and in an uninterrupted fashion. To this end, a moving system is mounted outside the test tube, said moving system comprising two light sources with each of which there is associated a photoelectric cell, the vertical distance which exists between the two light sources being equal to the vertical distance between the highest point of the immersed mass and the lowest point thereof, while the photoelectric cells effect the rotation of an electric motor either in one direction or in the other depending on the cell which generates current, and the said electric motor controls in its turn the upward or downward movement of the moving system.

A writing device which is rigidly fixed to said moving system can record in known manner the displacements of said moving system and consequently the movements of the immersed mass which are proportional to the specific gravity of the liquid.

The second form of embodiment referred to above readily permits measurements to be taken in continuous sequence; however, these measurements can only be accurate on condition that the liquid is perfectly motionless. It is therefore preferable to admit the liquid inside the test tube only intermittently. This intermittent admission could be carried out manually. It is preferably carried out by means of an electromagnetic admission valve, the operation of which is under the control of the motor which actuates the moving system. The assembly is so arranged that said valve remains open only during a predetermined period of time and can be opened only when the motor has stopped.

Further characteristic features of the present invention will be brought out by the description which follows below, reference being made to the accompanying drawings, which are given solely by way of example and not in any sense by way of limitation, and in which:

FIGS. 1 and 2 are schematic sectional elevations illustrating two forms of embodiment of the invention.

Figure 3:
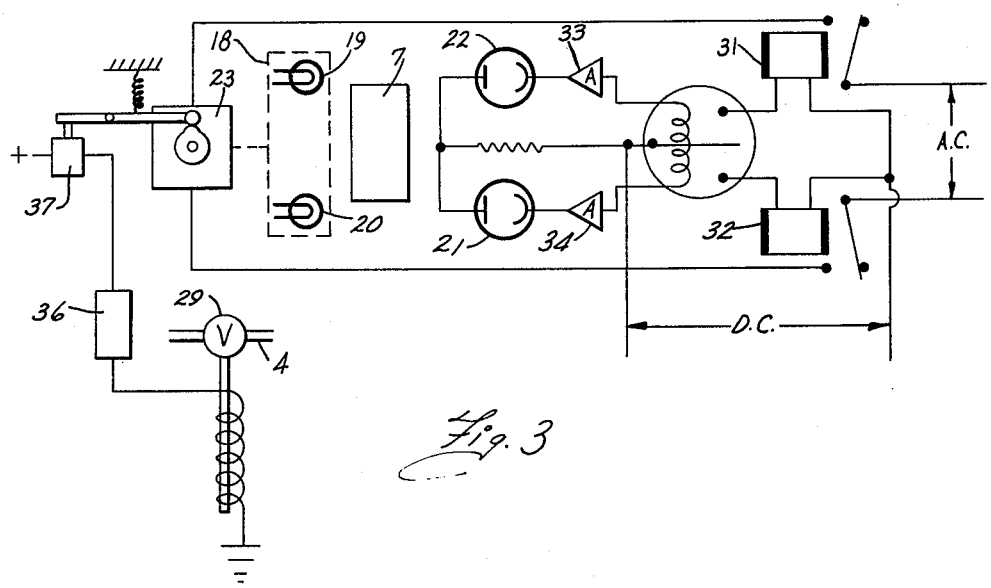
FIGURE 3 is a schematic diagram illustrating circuitry associated with the apparatus of FIGURE 2.

In accordance with the form of embodiment of FIG. 1, the apparatus comprises a test tube 1 graduated in equal divisions starting from the top edge thereof and which is closed by a bottom plate 2 and a top plate 3, the plate 2 providing a passage for a pipe 4 fitted with a valve 5 for the admission of liquid while the plate 3 is fitted with the pipe 6 for the evacuation of said liquid.

Inside the test tube 1 is disposed a mass 7 and two counterpoise chains 8 and 9 having constant linear weight which are attached at 10 and 11 respectively to the bottom portion of said mass and at 12 and 13 respectively to the plate 3.

When the tube 1 has been filled through the pipe 4 and the valve 5 with the liquid to be tested, the mass 7 takes up at 7a a position of equilibrium which is a function of the weight and the volume thereof, of the weight of the chains lifted by said mass and of the specific gravity of the liquid.

If the top 14 of the mass 7 is taken as a reference and is located at 14a and if we designate references such that:

H denotes the distance between the top of the test tube and the top 14 of the plunger in the lowest position of this latter;
p denotes the linear weight of the chain;
S denotes the specific gravity of the material which constitutes the chain;
V denotes the volume of the mass 7;
P denotes the weight of said mass;
h denotes the distance between the top of the mass 7 in its position of equilibrium and the top of the test tube;
D denotes the specific gravity of the liquid;

We have:

$$D=\frac{P+p(H-h)}{V+\frac{p}{S}(H-h)}$$

The only variable of the formula, in respect of a given apparatus, is therefore $h$. It is then possible either to graduate the test tube so as to read directly the specific gravity of the liquid or to draw up a table giving D as a function of $h$, the test tube being then graduated in millimeters.

This height $h$ is read by means of the magnifying glass or telescope 15.

The same elements as those found in FIG. 1 are again met with in the form of embodiment of FIG. 2, with this difference that the test tube 1 has a double wall and is fitted with an inlet connector 16 and an outlet connector 17, thereby providing means for causing a thermostatic liquid to flow therein.

On the outside of said test tube 1, there is provided a moving system 18 which essentially comprises two light sources 19 and 20 to which there correspond two photoelectric cells 21 and 22 respectively. As shown in the drawings, the distance which exists between the light sources 19 and 20 is equal to the height of the immersed mass 7.

The currents which can be generated in the cells 21 and 22 control in known manner, for example by energizing relays 31 and 32 after having been amplified by amplifiers 33 and 34, the supply of current to a motor 23, the system of connection being such that the motor rotates in one direction or in the other depending on whether the control current is generated by the cell 21 or by the cell 22. By means of the driving pulley 24 and the guide pulley 25, the motor 23 produces a displacement of the cable 26, the ends 27 and 28 of which are rigidly fixed to the moving system.

This constructional assembly operates in the following manner:

The apparatus being in the position of equilibrium, that is to say the position illustrated in FIG. 2, the cells 21 and 22 are supplied with very small and equal amounts of light; the current supply to the motor is cut off and the moving system remains in the position which is illustrated. If the density of the liquid varies, the mass 7 will accordingly be displaced, for example in the upward direction; the cell 21 is illuminated and effects the supply of current to the motor which begins to rotate in a direction such that the moving system is also displaced upwards. The reverse operation takes place when the mass 7 moves downwards or when the moving system has passed beyond the location of said mass; it is in that case the cell 22 which is illuminated and which produces the rotation of the motor in the reverse direction.

The density of a liquid, for example a liquid flowing inside a conduit, can be measured in a continuous manner by means of the device such as the device shown in FIG. 2. Since the measurement can be taken only on condition that the liquid is perfectly still, this latter cannot flow continuously through the test tube. It is accordingly preferable to admit the liquid in the test tube through an electro-magnetic valve 29 which is inserted inside the pipe 4; said valve is time-controlled by a timing means 36 connected through a switch 37 responsive to operation of the motor 23 and so arranged that said valve can open only if the motor 23 does not rotate.

When the apparatus is employed in this manner, it is preferable to mount on the moving system a recording stylus 30 which provides a means of recording the variations of density.

This device can also be employed for the purpose of maintaining constant the density of a mixture of liquids; with this object in view, the movements of displacement of the moving system can be used for the purpose of varying the extend of opening of a valve which regulates the admission of one of the liquids of the mixture.

It is understood that the modes of execution of the present invention which have just been described are only non-limitative examples and that any detail modifications can be made therein without consequently departing from the scope or the spirit of the invention. In particular, it is an advantage to give to the test tube and to the immersed mass complementary shapes such that said mass does not rotate with respect to the test tube; similarly, the cover can be made fluid-tight in order to permit of measurements under pressure.

What I claim is:

1. Densitometer which essentially comprises in combination an upright test tube for containing the liquid to be tested, a mass within said test tube and of smaller cross sectional size than said test tube so that it can move freely within said test tube, said mass being immersible in said liquid and the apparent density of which is lower than the density of said liquid, two downwardly hanging chains having a constant linear weight and the lower ends of which are secured to said mass on opposite sides thereof and the upper ends of which are fixed with respect to the top portion of said test tube, whereby the position of said mass will differ for liquids of different densities.

2. Densitometer which essentially comprises in combination a graduated upright test tube for containing the liquid to be tested, a mass within said test tube and of smaller cross sectional size than said test tube so that it can move freely within said test tube, said mass being immersible in said liquid and the apparent density of which is lower than the density of said liquid, two vertical chains having a constant linear weight and the lower ends of which are secured to the bottom end of said mass on opposite sides thereof and the upper ends of which are fixed with respect to the top portion of said test tube, and means for indicating the position of the highest point of said immersed mass.

3. Densitometer which comprises essentially in combination an upright test tube for containing the liquid to be tested, a mass within said test tube and of smaller cross sectional size than said test tube so that it can move freely within said test tube, said mass being immersible in said liquid and the apparent density of which is lower than the density of said liquid, two vertical chains having a constant linear weight and the lower ends of which are secured to the bottom end of said mass on opposite sides thereof and the upper ends of which are fixed with respect to the top portion of said test tube, a moving system disposed outside of and adjacent said test tube for vertical movement therealong, said moving system comprising two vertically spaced light sources with each of which there is associated a photoelectric cell, the vertical spacing between the two light sources being equal to the vertical distance between the highest point of the immersed mass and the lowest point thereof so that the amount of light reaching the cells from the light sources is determined by the position of the mass with respect to the cells, a reversible electric motor connected to said moving system for effecting vertical movement thereof, means responsive to the electric output of said cells for operating said electric motor, the electric output of said photoelectric cells producing the rotation of said electric motor which is reversible either in one direction or in the other depending on which cell is generating current, and said motor producing in its turn the upward movement or downward movement of said moving system to cause said cells to be placed in line with the highest and lowest points of said mass, and indicator means responsive to the vertical position of said moving system on said tube for providing an output indicating the position of said mass within said tube.

4. Densitometer as claimed in claim 3, in which the two light sources are pinpoint sources and are disposed vertically one above the other on one side of said mass, the two cells being disposed vertically one above the other on the other side of the immersed mass and approximately in the vertical plane passing through the axis of said mass.

5. Densitometer as claimed in claim 3, in which a writing device is rigidly fixed to the moving system.

6. Densitometer which essentially comprises in combination an upright test tube for containing the liquid to be tested, a mass within said test tube and of smaller cross sectional size than said test tube so that it can move freely within said test tube, said mass being immersible in said liquid and the apparent density of which is lower than the density of said liquid, two vertical chains having a constant linear weight and the lower ends of which are secured to the bottom end of said mass on opposite sides thereof and the upper ends of which are fixed with respect to the top portion of said test tube, a moving system disposed outside of and adjacent said test tube for vertical movement therealong, said moving system comprising two vertically spaced light sources with each of which there is associated a photoelectric cell, the vertical spacing between the two light sources being equal to the vertical distance between the highest point of the immersed mass and the lowest point thereof so that the amount of light reaching the cells from the light sources is determined by the position of the mass with respect to the cells, a reversible electric motor connected to said moving system for effecting vertical movement thereof, means responsive to the electric output of said cells for operating said electric motor, the electric output of said photoelectric cells producing the rotation of said electric motor which is reversible either in one direction or in the other depending on which cell is generating current, and said motor producing in its turn the upward movement or downward movement of said moving system to cause said cells to be placed in line with the highest and lowest points of said mass, and indicator means responsive to the vertical position of said moving system on said tube for providing an output indicating the position of said mass within said tube, an electromagnetic valve for regulating the admission of the liquid to be tested in said test tube, said valve being connected for operation in response to operation of the motor in such manner that the valve opens when the motor is stopped.

7. Densitometer as claimed in claim 6, in which timing means are connected to said valve so that said valve opens only a certain length of time after the stoppage of the motor and remains open during a limited period of time.

References Cited by the Examiner
UNITED STATES PATENTS 2,635,461  4/53  Groth et al. _____ 73—32

FOREIGN PATENTS 596,874  1/48  Great Britain.
42,634  6/17  Sweden.

OTHER REFERENCES

Farquharson: "Precise Automatic Inexpensive Buret Reader," Review of Scientific Instruments, vol. 31, No. 7, pages 723–725, July 1960.

RICHARD C. QUEISSER, *Primary Examiner.*